US012557174B2

(12) United States Patent
Wang et al.

(10) Patent No.: US 12,557,174 B2
(45) Date of Patent: Feb. 17, 2026

(54) METHODS AND DEVICES FOR SIDELINK TRANSMISSIONS

(71) Applicant: Telefonaktiebolaget LM Ericsson (publ), Stockholm (SE)

(72) Inventors: Min Wang, Luleå (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 18/260,387

(22) PCT Filed: Jan. 7, 2022

(86) PCT No.: PCT/EP2022/050252
§ 371 (c)(1),
(2) Date: Jul. 5, 2023

(87) PCT Pub. No.: WO2022/152626
PCT Pub. Date: Jul. 21, 2022

(65) Prior Publication Data
US 2024/0057209 A1     Feb. 15, 2024

(30) Foreign Application Priority Data

Jan. 13, 2021  (WO) ................ PCT/CN2021/071610

(51) Int. Cl.
*H04W 76/28*     (2018.01)
*H04W 72/25*     (2023.01)
(52) U.S. Cl.
CPC ........... *H04W 76/28* (2018.02); *H04W 72/25* (2023.01)
(58) Field of Classification Search
None
See application file for complete search history.

(56) References Cited

U.S. PATENT DOCUMENTS

2016/0366645 A1* 12/2016 Song ................ H04W 52/0229
2021/0059005 A1*  2/2021 Hosseini ............. H04W 76/28
(Continued)

FOREIGN PATENT DOCUMENTS

| WO | 2021119474 A1 | 6/2021 |
| WO | 2022023066 A1 | 2/2022 |
| WO | 2022025682 A1 | 2/2022 |

OTHER PUBLICATIONS

"Discussion on Sidelink X", 3GPP TSG-RAN WG2 Meeting #112 electronic, R2-2009026, ZTE Corporation, Sanechips, Online, Nov. 2-13, 2020, 6 pages.

(Continued)

*Primary Examiner* — Jamaal Henson
(74) *Attorney, Agent, or Firm* — Murphy, Bilak & Homiller, PLLC

(57) ABSTRACT

A method implemented by a first terminal device (1101) is provided. The method comprises: transmitting a signaling indicating a suggestion on one or more sidelink discontinuous reception, SL DRX, configurations to a second terminal device (1102); receiving a first response for each of the SL DRX configurations from the second terminal device (1102). The first response may indicate one of: fully accepting, by the second terminal device, the suggestion; fully rejecting, by the second terminal device (1102), the suggestion; and partly accepting, by the second terminal device, the suggestion. Latency, power consumption and signaling overhead may be reduced. Data loss due to active time misalignment may be minimized. A good tradeoff between UE power consumption and performance of sidelink transmissions may be achieved.

11 Claims, 13 Drawing Sheets

(56) References Cited

U.S. PATENT DOCUMENTS

| | | | |
|---|---|---|---|
| 2021/0185757 A1* | 6/2021 | Purkayastha | H04W 76/27 |
| 2023/0064488 A1* | 3/2023 | Han | H04W 76/28 |
| 2023/0156858 A1* | 5/2023 | Freda | H04W 52/0219 |
| | | | 370/329 |
| 2023/0180343 A1* | 6/2023 | Park | H04W 76/14 |
| 2023/0189393 A1* | 6/2023 | Ying | H04W 4/46 |
| | | | 370/311 |
| 2023/0247553 A1* | 8/2023 | Zheng | H04W 76/28 |
| | | | 370/311 |
| 2023/0276359 A1* | 8/2023 | Xu | H04W 72/11 |
| | | | 370/318 |
| 2023/0276364 A1* | 8/2023 | Basu Mallick | H04W 52/0235 |
| | | | 370/311 |

OTHER PUBLICATIONS

LG Electronics, "New WID on NR sidelink enhancement", 3GPP TSG RAN Meeting #86, RP-193231, (revision of RP-193134), Sitges, Spain, Dec. 9-12, 2019, 1-6.

* cited by examiner

METHODS AND DEVICES FOR SIDELINK TRANSMISSIONS

TECHNICAL FIELD

The present disclosure generally relates to the field of sidelink transmissions, and more particularly to methods and devices for negotiation of sidelink discontinuous reception (SL DRX) configurations between user equipments (UEs).

BACKGROUND

This section introduces aspects that may facilitate better understanding of the present disclosure. Accordingly, the statements of this section are to be read in this light and are not to be understood as admissions about what is in the prior art or what is not in the prior art.
NR Frame Structure Similar to LTE (Long-Term Evolution), NR (New Radio) uses OFDM (Orthogonal Frequency Division Multiplexing) in the downlink (i.e. from a network node, gNB, eNB, or base station, to a user equipment or UE). The basic NR physical resource over an antenna port may be seen as a time-frequency grid as illustrated in FIG. 1, where a resource block (RB) in a 14-symbol slot is shown. The resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^{\mu})$ kHz where $\mu\in(0,1,2,3,4)$. $\Delta f=15$ kHz is the basic (or reference) subcarrier spacing that is also used in LTE.

In the time domain, downlink and uplink transmissions in NR may be organized into equally-sized subframes of 1 ms each similar to LTE. A subframe is further divided into multiple slots of equal duration. The slot length for subcarrier spacing $\Delta f=(15\times 2^{\mu})$ kHz is $\frac{1}{2}^{\mu}$ ms. There is only one slot per subframe for $\Delta f=15$ kHz and a slot consists of 14 OFDM symbols.

Downlink transmissions are dynamically scheduled, i.e., in each slot, the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes a PDCCH, and if a PDCCH is decoded successfully, the UE then decodes the corresponding PDSCH based on the downlink assignment provided by decoded control information in the PDCCH.

In addition to the PDCCH and the PDSCH, there are also other channels and reference signals transmitted in the downlink, including SSB, CSI-RS, etc.

Uplink data transmissions, carried on the Physical Uplink Shared Channel (PUSCH), may also be dynamically scheduled by the gNB by transmitting DCI. The DCI (which is transmitted in the downlink region) always indicates a scheduling time offset so that the PUSCH is transmitted in a slot in the uplink region.
Sidelink Transmissions in NR Sidelink transmissions over New Radio (NR) are specified in the 3rd Generation Partnership Project in Release 16, including enhancements of Proximity-based Services (ProSe) specified for Long Term Evolution (LTE). Four new enhancements are particularly introduced to NR sidelink transmissions as follows:

Support for unicast and groupcast transmissions is added in NR sidelink. For unicast and groupcast, a Physical Sidelink Feedback Channel (PSFCH) is introduced for a receiver User Equipment (UE) to reply a decoding status to a transmitter UE.

Grant-free transmissions, which are adopted in NR uplink transmissions, are also provided in NR sidelink transmissions, to improve the latency performance.

To alleviate resource collisions among different sidelink transmissions launched by different UEs, it enhances channel sensing and resource selection procedures, which also leads to a new design of Physical Sidelink Common Control Channel (PSCCH).

To achieve a high connection density, congestion control and thus QoS management are supported in NR sidelink transmissions.

To enable the above enhancements, new physical channels and reference signals are introduced in NR:

Physical Sidelink Shared Channel (PSSCH), a sidelink version of Physical Downlink Shared Channel (PDSCH): The PSSCH is transmitted by a sidelink transmitter UE, and conveys sidelink transmission data, System Information Blocks (SIBs) for Radio Resource Control (RRC) configuration, and a part of Sidelink Control Information (SCI), a sidelink version of Downlink Control Information (DCI).

PSFCH, a sidelink version of Physical Uplink Control Channel (PUCCH): The PSFCH is transmitted by a sidelink receiver UE for unicast and groupcast, and conveys 1 bit information over 1 Resource Block (RB) for a Hybrid Automatic Repeat reQeust (HARQ) acknowledgement (ACK) or a negative ACK (NACK). In addition, Channel State Information (CSI) is carried in a Medium Access Control (MAC) Control Element (CE) over the PSSCH instead of the PSFCH.

PSCCH, a sidelink version of Physical Downlink Control Channel (PDCCH): When traffic to be sent to a receiver UE arrives at a transmitter UE, the transmitter UE should first send the PSCCH, which conveys a part of SCI to be decoded by any UE for the channel sensing purpose, including reserved time-frequency resources for transmissions, DeModulation Reference Signal (DMRS) pattern, and antenna port, etc.

Sidelink Primary/Secondary Synchronization Signal (S-PSS/S-SSS): Similar to downlink transmissions in NR, in sidelink transmissions, S-PSS and S-SSS are supported. Through detecting the S-PSS and S-SSS, a UE is able to identify a Sidelink Synchronization Identity (SSID) from the UE sending the S-PSS/S-SSS. The UE is therefore able to know the characteristics of the transmitter UE from the S-PSS/S-SSS. A series of processes of acquiring timing and frequency synchronization together with SSIDs of UEs is called initial cell search. Note that the UE sending the S-PSS/S-SSS may not be necessarily involved in sidelink transmissions, and a node (e.g., UE, evolved NodeB (eNB), or (next) generation NodeB (gNB)) sending the S-PSS/S-SSS is called a synchronization source. There are 2 S-PSS sequences and 336 S-SSS sequences forming a total of 672 SSIDs in a cell.

Physical Sidelink Broadcast Channel (PSBCH): The PSBCH is transmitted along with the S-PSS/S-SSS as a Synchronization Signal/PSBCH Block (SSB). The SSB has the same numerology as PSCCH/PSSCH on the carrier, and an SSB should be transmitted within the bandwidth of the configured BWP. The PSBCH conveys information related to synchronization, such as the Direct Frame Number (DFN), an indication of the slot and symbol level time resources for sidelink transmissions, an in-coverage indicator, etc. The SSB is transmitted periodically at every 160 ms.

DMRS, Phase Tracking Reference Signal (PT-RS), Channel State Information Reference Signal (CSI-RS): These physical reference signals supported by NR downlink/uplink transmissions are also adopted by sidelink transmissions. Similarly, the PT-RS is only applicable for Frequency Range 2 (FR2) transmission.

SUMMARY

An object of the present disclosure is to provide methods and devices for negotiation of SL DRX configurations between UEs.

According to a first aspect of the present disclosure, a method implemented by a first terminal device is provided. The method comprises: transmitting a signaling indicating a suggestion on one or more sidelink discontinuous reception, SL DRX, configurations to a second terminal device; and receiving a first response for each of the SL DRX configurations from the second terminal device. The first response may indicate one of: fully accepting, by the second terminal device, the suggestion; fully rejecting, by the second terminal device, the suggestion; and partly accepting, by the second terminal device, the suggestion. In some scenarios, the method may further comprise determining whether to continue negotiation about the SL DRX configurations with the second terminal device based on the received response.

In a further embodiment of the first aspect, in the case that the first response indicates the full rejection of the suggestion, the method may further comprise one of: falling back to a default or common DRX configuration; falling back to a DRX configuration on which the first terminal device and the second terminal device have agreed; and applying no DRX.

In a further embodiment of the first aspect, in the case that the first response indicates the partial acceptance of the suggestion, the first response may indicate making a suggestion on non-accepted DRX parameters.

In a further embodiment of the first aspect, in the case that the first response indicates the partial acceptance of the suggestion, the method may further comprise: negotiating about the non-accepted DRX parameters with the second terminal device.

In a still further embodiment of the first aspect, the negotiation about the non-accepted DRX parameters with the second terminal device may terminate when a configured time period has been expired; when a configured number of steps have been performed; and/or when the first terminal device and the second terminal device have made agreements within a configured time period or a configured number of steps.

According to a second aspect of the present disclosure, a method implemented by a second terminal device is provided. The method comprises: receiving, from a first terminal device, a signaling indicating a suggestion on one or more sidelink discontinuous reception, SL DRX, configurations; and transmitting, to the first terminal device, a first response for each of the SL DRX configurations. The first response may indicate one of: fully accepting, by the second terminal device, the suggestion; fully rejecting, by the second terminal device, the suggestion; and partly accepting, by the second terminal device, the suggestion.

According to a third aspect of the present disclosure, a method implemented by a control node is provided. The method comprises: receiving, from a terminal device, a sidelink discontinuous reception, SL DRX, configuration updated based on a negotiation process between the terminal device and a peer terminal device; adjusting Uu DRX configurations and/or the SL DRX configuration; and transmitting the adjusted Uu DRX configurations and/or SL DRX configuration to the terminal device.

According to a fourth aspect of the present disclosure, a first terminal device is provided. The first terminal device comprises a processor and a memory communicatively coupled to the processor. The memory is adapted to store instructions which, when executed by the processor, cause the first terminal device to perform operations of the method according to the above first aspect.

According to a fifth aspect of the present disclosure, a first terminal device is provided. The first terminal device is adapted to perform the method of the above first aspect.

According to a sixth aspect of the present disclosure, a second terminal device is provided. The second terminal device comprises a processor and a memory communicatively coupled to the processor. The memory is adapted to store instructions which, when executed by the processor, cause the second terminal device to perform operations of the method according to the above second aspect.

According to a seventh aspect of the present disclosure, a second terminal device is provided. The second terminal device is adapted to perform the method of the above second aspect.

According to an eighth aspect of the present disclosure, a control node is provided. The control node comprises a processor and a memory communicatively coupled to the processor. The memory is adapted to store instructions which, when executed by the processor, cause the control node to perform operations of the method according to the above third aspect.

According to a ninth aspect of the present disclosure, a control node is provided. The control node is adapted to perform the method of the above third aspect.

According to a tenth aspect of the present disclosure, a wireless communication system is provided. The wireless communication system comprises: a first terminal device according to the above fourth or fifth aspect; a second terminal device according to the above sixth or seventh aspect communicating with at least the first terminal device; and a control node according to the above eighth or ninth aspect communicating with at least the first terminal device and the second terminal device.

According to an eleventh aspect of the present disclosure, a non-transitory computer readable medium having a computer program stored thereon is provided. When the computer program is executed by a set of one or more processors of a first terminal device, the computer program causes the first terminal device to perform operations of the method according to the above first aspect.

According to a twelfth aspect of the present disclosure, a non-transitory computer readable medium having a computer program stored thereon is provided. When the computer program is executed by a set of one or more processors of a second terminal device, the computer program causes the second terminal device to perform operations of the method according to the above second aspect.

According to a thirteenth aspect of the present disclosure, a non-transitory computer readable medium having a computer program stored thereon is provided. When the computer program is executed by a set of one or more processors of a control node, the computer program causes the control node to perform operations of the method according to the above third aspect.

With the methods and devices of the present disclosure, latency, power consumption and signaling overhead may be reduced. Active time on the sidelink may be aligned between a transmitter (TX) UE and a receiver (RX) UE. In this way, data loss due to active time misalignment may be minimized. A good tradeoff between UE power consumption and performance of sidelink transmissions may be achieved.

BRIEF DESCRIPTION OF THE DRAWINGS

The present disclosure may be best understood by way of example with reference to the following description and accompanying drawings that are used to illustrate embodiments of the present disclosure. In the drawings.

DETAILED DESCRIPTION

Figure 1:
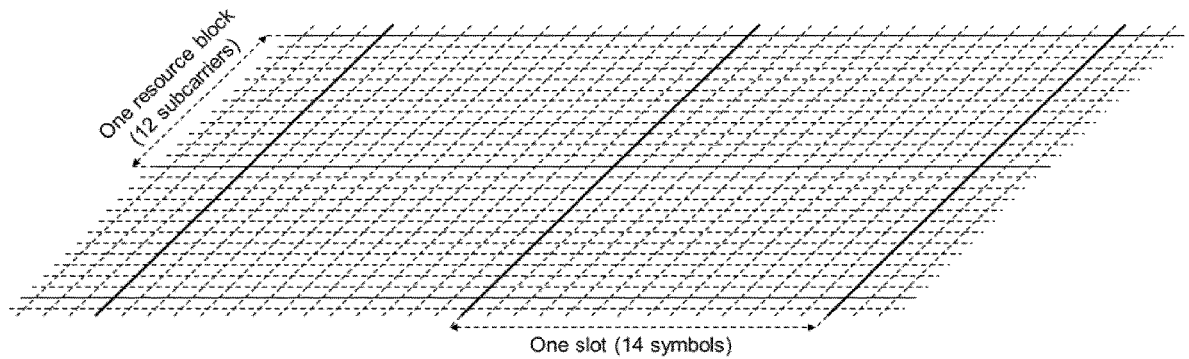
FIG. 1 is a diagram illustrating an NR physical resource grid.

The following detailed description describes methods and devices for negotiation of SL DRX configurations between UEs. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

In the following detailed description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other forms of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interfaces to establish network connections (to transmit and/or receive code and/or data using propagating signals) with other electronic devices. One or more parts of an embodiment of the present disclosure may be implemented using different combinations of software, firmware, and/or hardware.

For sidelink transmissions in NR, two-stage sidelink control information (SCI) is introduced. This is a version of DCI for SL. Unlike the DCI, only part (first stage) of the SCI is sent on the PSCCH. This part is used for channel sensing purposes (including the reserved time-frequency resources for transmissions, demodulation reference signal (DMRS) pattern and antenna port, etc.) and may be read by all UEs while the remaining (second stage) scheduling and control information such as an 8-bit source identity (ID) and a 16-bit destination ID, a new data indicator (NDI), a redundancy version (RV) and a HARQ process ID is sent on the PSSCH to be decoded by the receiver UE.

Similar to PRoSe in LTE, NR sidelink transmissions have the following two modes of resource allocations:

Mode 1: Sidelink resources are scheduled by a gNB.

Mode 2: The UE autonomously selects sidelink resources from a (pre-)configured sidelink resource pool(s) based on the channel sensing mechanism.

For an in-coverage UE, a gNB may be configured to adopt Mode 1 or Mode 2. For an out-of-coverage UE, only Mode 2 may be adopted.

As in LTE, scheduling over the sidelink in NR is performed in different ways for Mode 1 and Mode 2.

Mode 1 supports the following two types of grants:

Dynamic grant: When the traffic to be sent over the sidelink arrives at a transmitter UE, this UE should launch a four-message exchange procedure to request sidelink resources from a gNB (SR on uplink (UL), grant, buffer status report (BSR) on UL, grant for data on SL sent to UE). During the resource request procedure, a gNB may allocate a sidelink radio network temporary identifier (SL-RNTI) to the transmitter UE. If this sidelink resource request is granted by a gNB, then the gNB indicates the resource allocation for the PSCCH and the PSSCH in the DCI conveyed by the PDCCH with cyclic redundancy check (CRC) scrambled with the SL-RNTI. When the transmitter UE receives such DCI, the transmitter UE may obtain the grant only if the scrambled CRC of the DCI may be successfully solved by the assigned SL-RNTI. The transmitter UE then indicates time-frequency resources and a transmission scheme of the allocated PSSCH in the PSCCH, and launches the PSCCH and the PSSCH on the allocated resources for the sidelink transmissions. When a grant is obtained from the gNB, the transmitter UE may only transmit a single transport block (TB). As a result, this type of grant may be suitable for traffic with a loose latency requirement.

Configured grant: For traffic with a strict latency requirement, performing the four-message exchange procedure to request sidelink resources may induce unacceptable latency. In this case, prior to the traffic arrival, a transmitter UE may perform the four-message exchange procedure and request a set of resources. If a grant may be obtained from a gNB, then the requested resources may be reserved in a periodic manner. Upon arrival of traffic at a transmitter UE, this UE may launch the PSCCH and the PSSCH on the upcoming resource occasion. In fact, this type of grant is also known as grant-free transmissions.

In both dynamic grant and configured grant, a sidelink receiver UE cannot receive the DCI (since it is addressed to the transmitter UE), and therefore the receiver UE should perform blind decoding to identify presence of PSCCH and find resources for the PSSCH through the SCI.

When the transmitter UE launches the PSCCH, CRC is also inserted in the SCI without any scrambling.

In the Mode 2 resource allocation, when traffic arrives at a transmitter UE, this transmitter UE should autonomously select resources for the PSCCH and the PSSCH. To further minimize latency of feedback HARQ ACK/NACK transmissions and subsequent retransmissions, the transmitter UE may also reserve resources for PSCCH/PSSCH for the retransmissions. To further enhance a probability of successful TB decoding at one shot and thus suppressing a probability to perform retransmissions, the transmitter UE may repeat the TB transmission along with the initial TB transmission. This mechanism is also known as blind retransmission. As a result, when traffic arrives at a transmitter UE, this transmitter UE should select resources for the following transmissions:

1) The PSSCH associated with the PSCCH for initial transmission and blind retransmissions.
2) The PSSCH associated with the PSCCH for retransmissions.

Since each transmitter UE in sidelink transmissions should autonomously select resources for above transmissions, how to prevent different transmitter UEs from selecting the same resources turns out to be a critical issue in Mode 2. A particular resource selection procedure is therefore imposed to Mode 2 based on channel sensing. The channel sensing algorithm involves measuring reference signal received power (RSRP) on different subchannels and requires knowledge of the different UEs' power levels of DMRS on the PSSCH or the DMRS on the PSCCH depending on the configuration. This information is known only after receiver SCI launched by (all) other UEs. The sensing and selection algorithm may be complex.

UE energy saving is an important performance indicator. There is no energy saving feature defined for SideLink until 3GPP Rel-16. In the 3GPP Rel-17 WI on NR sidelink enhancement, the following objective on UE Sidelink energy saving has been agreed and will be studied in 3GPP Rel-17 time frame.

Sidelink discontinuous reception (DRX) for broadcast, groupcast, and unicast 1) defines on- and off-durations in sidelink and specifies the corresponding UE procedure;
2) specifies a mechanism aiming to align sidelink DRX wake-up time among the UEs communicating with each other;
3) specifies mechanism aiming to align sidelink DRX wake-up time with Uu DRX wake-up time in an in-coverage UE.

From the above objectives, DRX mechanisms for Sidelink may be designed and specified in 3GPP Rel-17.

At RAN2 #112-e, two options have been discussed, i.e., TX UE centric or RX UE centric.

For the TX UE centric option, a TX UE (or its serving gNB in the case the TX UE is in coverage) sends a desired SL DRX configuration to an RX UE. The RX UE follows the received SL DRX configuration.

For the RX UE centric option, an RX UE informs a TX UE of its DRX configuration. The TX UE follows the received DRX configuration from the RX UE and transmits data to the RX UE only when the RX UE is in active.

The TX UE centric option has the benefit that it is aligned with Rel-16 signaling framework. However, it has the drawback that the RX UE may have to always keep in active time by following instructions from all TX UEs, and therefore have no power saving especially when the RX UE is connected to multiple TX UEs.

Meanwhile, the RX UE centric option can achieve better power saving for the RX UE. However, the RX UE centric option would require bigger spec changes than the TX UE centric option. In addition, longer delay may be caused for data transfer at the TX UE, since the TX UE may not be able to transmit immediately to the RX UE when there is data available.

Therefore, neither the TX centric option nor the RX centric option can give good performance in terms of both power saving and service QoS satisfaction (e.g., latency requirement). It is important to develop a mechanism to achieve a trade-off between the power saving and the service QoS satisfaction in terms of the latency requirement.

A scenario comprising a first UE (UE1) served by a first cell (cell1) may be provided. UE1 is further configured to communicate with at least one another UE, a second UE (UE2), on sidelink resources. UE1 and UE2 are capable of SL operations. Examples of SL operations are transmission of SL signals by UE1, reception of SL signals at UE1 from UE2, etc.

To enable UL and SL operations, UE1 is further configured with one or more SL resources and one or more UL resources. At least one of the SL resources may be a SL time resource and also at least one of the UL resources may be a UL time resource. Examples of time resources are symbol, slot, subframe, frame, etc. The UE transmits UL signals on one or more UL resources to at least cell1, i.e., to the serving cell. The UE transmits and/or receives SL signals on one or more SL resources to/from at least UE2. Examples of the UL signals are SRS, DMRS, PUCCH, PUSCH, RACH, etc. Examples of the SL signals are DMRS, PSCCH, PSSCH, PSFCH, etc.

The term time resource used herein may correspond to any type of physical resource or radio resource expressed in terms of length of time. Examples of time resources are: symbol, time slot, subframe, radio frame, transmission time interval (TTI), interleaving time, etc. The term TTI used herein may correspond to any time period over which a physical channel may be encoded and optionally interleaved for transmission. The physical channel is decoded by the receiver over the same time period over which it was encoded. The TTI may also interchangeably called as short TTI (sTTI), transmission time, slot, sub-slot, mini-slot, mini-subframe, etc.

The term time-frequency resource used herein for any radio resource may be defined in any time-frequency resource grid in a radio interface. Examples of the time-frequency resource are subcarrier, resource block (RB), etc. The RB may also be interchangeably called as physical RB (PRB), virtual RB (VRB), etc.

A link or radio link over which the signals are transmitted between at least two UEs for device to device communication (D2D) operation is called herein as the sidelink (SL). The signals transmitted between the UEs for D2D operation are called herein as SL signals. The term SL may also interchangeably be called as D2D link, vehicle to everything (V2X) link, prose link, peer-to-peer link, PC5 link, etc. The SL signals may also interchangeably be called as V2X signals, D2D signals, prose signals, PC5 signals, peer-to-peer signals etc.

The proposed mechanisms in the embodiments of the present disclosure are applicable to a first UE (UE1) with both UL and SL operations. UE1 connects to at least a second UE (UE2) via an SL. UE1 is configured with both Uu DRX and SL DRX. UE2 is configured with SL DRX, and may also be configured with Uu DRX.

In the embodiments of the present disclosure, the wording "at least one of" is used in the description of signaling alternatives between two nodes (i.e., between two UEs, or between a gNB and a UE). This wording means that a node may transmit the signaling information to another node using one or more than one alternative. For the latter case, the node applies several different signaling alternatives to transmit the same content of the information to the other node to improve the transmission reliability.

In an embodiment, UE1 sends one or more of its SL DRX configurations to UE2 via at least one of the following signaling alternatives:
  PC5-RRC
  MAC CE
  Control PDU of a protocol layer (e.g., SDAP, PDCP, or RLC, or an adaptation protocol layer in case of SL relay)
  L1 signaling (on PSCCH, PSSCH, or PSFCH).

The signaling is initiated upon occurrence of at least one of the below events:
  a PC5 link/PC5-RRC connection is established between UE1 and UE2
  A PC5 session is established or reconfigured belonging to a PC5 link/PC5-RRC connection between UE1 and UE2
  A PC5 data radio bearer (DRB) or signaling radio bearer (SRB) is established or reconfigured belonging to a PC5 link/PC5-RRC connection between UE1 and UE2
  Generation or reconfiguration of one or multiple Uu DRX configurations of UE1.

The signaling carries either details of one or more of the UE's SL DRX configurations, or indices of one or more of the UE's SL DRX configurations without configuration details. For the former, it may be the first time that UE1 sends these SL DRX configurations to UE2. UE2 has not received or stored any relevant information on these SL DRX configurations yet. For the latter, before reception of the signaling, UE2 may have already stored a set of SL DRX configurations (e.g., preconfigured or signaled by UE1 initially). In this case, UE1 may only need to signal the indices of these DRX configurations.

In a further embodiment, upon reception of a signaling containing one or more SL DRX configurations from UE1, for each received SL DRX configuration, UE2 replies to UE1 with a signaling indicating one of the following:
  Option 1: fully accepting the suggestion, and applying the SL DRX configuration for the corresponding communication with UE1
  Option 2: full rejecting the suggestion
  Option 3: partly accepting the suggestion, and optionally in addition, suggesting compromised settings to the parameters which are not accepted.

UE2's response message is signaled via at least one of the following signaling alternatives:
  PC5-RRC
  MAC CE
  Control PDU of a protocol layer (e.g., SDAP, PDCP, or RLC, or an adaptation protocol layer in case of SL relay)
  L1 signaling (on PSCCH, PSSCH, or PSFCH).

In the case that UE1 has suggested multiple SL DRX configurations to UE2 via the signaling as described in the first embodiment, UE2 may provide a response message for each SL DRX configuration separately. Among all these DRX configurations, the response to an SL DRX configuration may be different from the response to another SL DRX configuration.

In a further embodiment, if UE1 has received a response from UE2 indicating full rejection to an SL DRX configuration that has been suggested by UE1, UE1 and UE2 may apply one of the below options to take further actions.

Option 1: both UE1 and UE2 fall back to a default or common DRX configuration. This DRX configuration is already configured or preconfigured to both UEs initially. This DRX configuration is common to a group of UEs (e.g., the configuration is associated with a resource pool shared by this group of UEs).

Option 2: both UE1 and UE2 fall back to another DRX configuration, on which UE1 and UE2 has already achieved agreement.

Option 3: both UE1 and UE2 apply no DRX.

If the SL DRX configuration which has been suggested by UE1 is applicable/limited to a specific application, service, traffic type, LCH, LCG, multicast group, cast type or resource pool, any one of the above options which both UEs would apply will also be applicable/limited to the same application, service, traffic type, LCH, LCG, multicast group, cast type or resource pool as the SL DRX configuration.

In a further embodiment, upon reception of a response message from UE2 indicating that UE2 has partly accepted the suggested SL DRX configuration, for the associated SL DRX configuration, UE1 further replies to UE2 via at least one of the same options as described in the second embodiment, i.e., Option 1: fully accepting the suggestion, and applying for the corresponding communication with UE2
Option 2: full rejecting the suggestion
Option 3: partly accepting the suggestion, and in addition, suggesting compromised settings to the parameters which are not accepted.

UE1's response message is signaled via at least one of the following signaling alternatives:
PC5-RRC
MAC CE
Control PDU of a protocol layer (e.g., SDAP, PDCP, or RLC, or an adaptation protocol layer in case of SL relay)
L1 signaling (on PSCCH, PSSCH, or PSFCH).

In a further embodiment, for a negotiation process on an SL DRX configuration between UE1 and UE2, the process may comprise more than 2 steps (e.g., 3 or 4 steps). In the case that UE1 and UE2 keep partly accepting suggestions from each other, the negotiation process will last for many rounds. After each step, UE1 and UE2 may agree on more DRX parameters than the last step. The process may conclude eventually in one of the below cases:

Case 1: UE1 and UE2 agree on all DRX parameters eventually
Case 2: UE1 and UE2 only agree on part of all DRX parameters.

The negotiation process may complete/terminate due to one of the below reasons:
A configured time period has been expired
A configured number of steps have passed
Both UEs have made agreements within a configured time period or a configured number of steps.

In a further embodiment, for a negotiation process on an SL DRX configuration between UE1 and UE2, after the process has completed/terminated, however, there may still be at least one DRX parameter on which the UEs cannot make agreement. In this case, UE1 and UE2 may apply one of the below options to take further actions.

Option 1: both UE1 and UE2 apply default or common settings for these DRX parameters. These settings are already configured or preconfigured to both UEs initially.

Option 2: UE1 and UE2 apply no DRX.

If the SL DRX configuration which has been suggested by UE1 is applicable/limited to a specific application, service, traffic type, LCH, LCG, multicast group, cast type or resource pool, any one of the above options which both UEs would apply will also be applicable/limited to the same application, service, traffic type, LCH, LCG, multicast group, cast type or resource poo as the SL DRX configuration.

In a further embodiment, for either UE1 or UE2, in the case that the UE has updated an SL DRX configuration based on a negotiation process with its peer UE, the UE signals the updated SL DRX configuration to its serving gNB. Upon reception of the signaling, the gNB may adjust Uu DRX configurations and/or the SL DRX configuration of the UE and signals the adjusted Uu DRX configurations and/or SL DRX configuration to the UE.

After reception of the adjusted Uu DRX configurations and/or SL DRX configuration from the gNB, the UE may signal them to its peer UE via at least one of the following signaling alternatives:
PC5-RRC
MAC CE
Control PDU of a protocol layer (e.g., SDAP, PDCP, or RLC, or an adaptation protocol layer in case of SL relay)
L1 signaling (on PSCCH, PSSCH, or PSFCH).

A new negotiation process between the UEs may be initiated.

In a further embodiment, for any one of the above embodiments, the relevant configurations (e.g., which option should be applied by a UE) are configured to the UE by a gNB or a controlling UE. Alternatively, the relevant configurations are preconfigured to the UE.

In a further embodiment, for a UE pair (e.g., UE1 and UE2), either UE1 or UE2 can initiate a negotiation process on a SL DRX configuration. The UE which initiates the negotiation process does not have to be the UE which initiates a connection to its peer UE.

Figure 2:
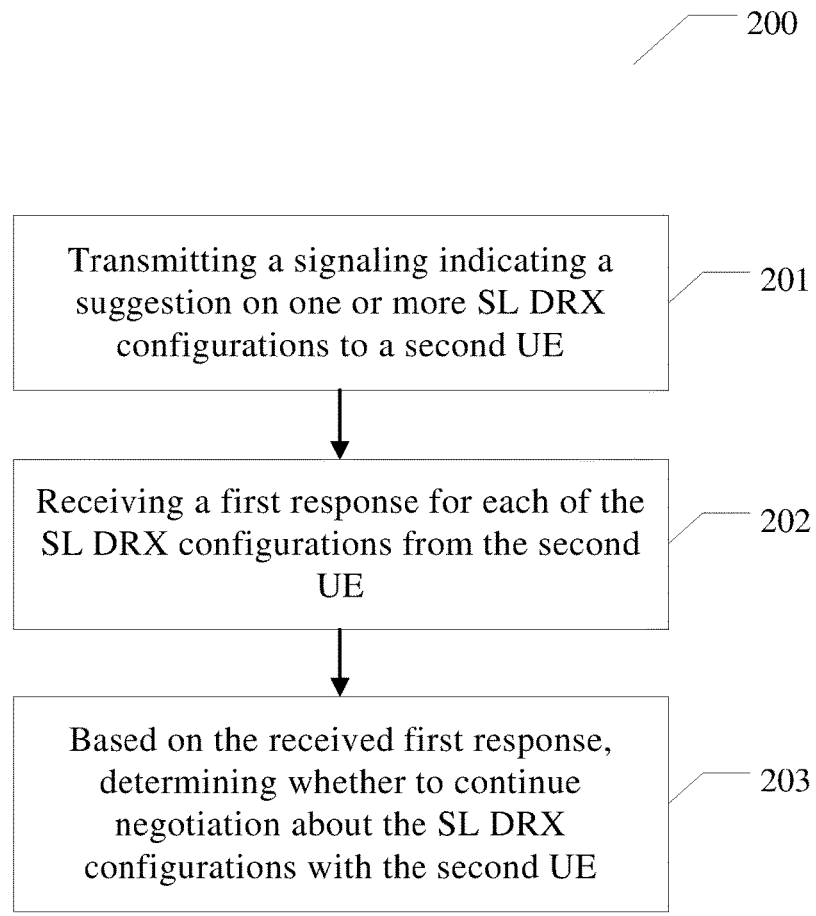
FIG. 2 is a flow chart illustrating a method implemented on a first terminal device according to some embodiments of the present disclosure.

FIG. 2 is a flow chart illustrating a method 200 implemented on a first terminal device according to some embodiments of the present disclosure. As an example, operations of this flow chart may be performed by a first UE which may initiate a negotiation process for SL DRX configurations, but they are not limited thereto. The operations in this and other flow charts will be described with reference to the exemplary embodiments of the other figures. However, it should be appreciated that the operations of the flow charts may be performed by embodiments of the present disclosure other than those discussed with reference to the other figures, and the embodiments of the present disclosure discussed with reference to these other figures may perform operations different than those discussed with reference to the flow charts.

In one embodiment, the first UE may transmit a signaling indicating a suggestion on one or more SL DRX configurations to a second UE (block 201). Then, the first UE may receive a first response for each of the SL DRX configurations from the second UE (block 202). Based on the received first response, the first UE may optionally determine whether to continue negotiation about the SL DRX configurations with the second UE (block 203).

As an example, the signaling may be at least one of:
PC5-RRC signaling;
MAC CE;
a control PDU of a protocol layer; and
L1 signaling.

As an example, the transmission of the signaling may be initiated upon at least one of the following events:
a PC5 link or PC5-RRC connection is established between the first UE and the second UE;
a PC5 session belonging to the PC5 link or PC5-RRC connection is established or reconfigured;
a PC5 DRB or SRB belonging to the PC5 link or PC5-RRC connection is established or reconfigured; and
one or more Uu DRX configurations of the first UE are generated or reconfigured.

As an example, the signaling may comprise details of the one or more SL DRX configurations or indices of the one or more SL DRX configurations.

As an example, the first response may be received via at least one of:
PC5-RRC;
MAC CE;
a control PDU of a protocol layer; and
L1 signaling.

As an example, in the case that the signaling indicates the suggestion on a plurality of SL DRX configurations, the response for one of the SL DRX configurations is different from the response for another of the SL DRX configurations.

As an example, the first response may indicate one of:
fully accepting, by the second UE, the suggestion;
fully rejecting, by the second UE, the suggestion; and
partly accepting, by the second UE, the suggestion and making a suggestion on non-accepted DRX parameters.

As a further example, in the case that the first response indicates the full rejection of the suggestion, the method 200 may further comprise one of:
falling back to a default or common DRX configuration;
falling back to a DRX configuration on which the first UE and the second UE have agreed; and
applying no DRX.

As a further example, in the case that the first response indicates the partial acceptance of the suggestion, the method 200 may further comprise:
negotiating about the non-accepted DRX parameters with the second UE.

As a further example, the negotiation about the non-accepted DRX parameters with the second UE may further comprise: transmitting a second response for the non-accepted DRX parameters to the second UE. As a still further example, the second response may indicate one of: fully accepting, by the first UE, the suggestion on the non-accepted DRX parameters; fully rejecting, by the first UE, the suggestion on the non-accepted DRX parameters; and partly accepting, by the first UE, the suggestion on the non-accepted DRX parameters.

As a further example, the second response may be transmitted via at least one of:
PC5-RRC;
MAC CE;
a control PDU of a protocol layer; and
L1 signaling.

As a further example, the negotiation about the non-accepted DRX parameters with the second UE may comprise a plurality of transmissions of responses to the second UE in the case that the first UE and the second UE keep partly accepting suggestions from each other.

As a further example, the negotiation about the non-accepted DRX parameters with the second UE may terminate when:
a configured time period has been expired;
a configured number of steps have been performed; and/or
the first UE and the second UE have made agreements within a configured time period or a configured number of steps.

As a further example, when the negotiation about the non-accepted DRX parameters terminates, in the case that the first UE and the second UE do not agree on at least one DRX parameter, the method 200 may further comprise one of:
applying configured default or common settings to the at least one DRX parameter; and
applying no DRX.

As an example, in the case that one of the SL DRX configurations has been updated based on a negotiation process with the second UE, the method 200 may further comprise:
transmitting the updated SL DRX configuration to a control node;
receiving adjusted Uu DRX configurations and/or SL DRX configuration from the control node; and
transmitting the adjusted Uu DRX configurations and/or SL DRX configuration to the second UE.

As a further example, the adjusted Uu DRX configurations and/or SL DRX configuration may be transmitted to the second UE via at least one of:
PC5-RRC;
MAC CE;
a control PDU of a protocol layer; and
L1 signaling.

As an example, configurations of the first UE and the second UE may be signaled by a control node or preconfigured.

As a further example, the control node may be a gNB, or a controlling UE, or a combination of the gNB and the controlling UE.

Furthermore, the present disclosure provides a first terminal device adapted to perform the method 200.

Figure 3:
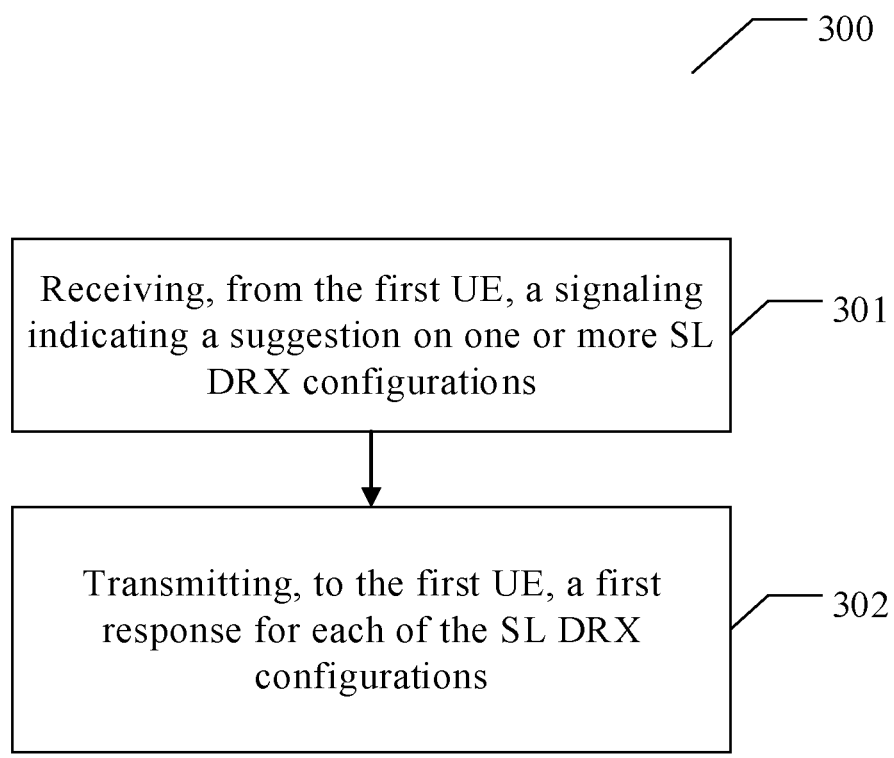
FIG. 3 is a flow chart illustrating a method implemented on a second terminal device according to some embodiments of the present disclosure.

FIG. 3 is a flow chart illustrating a method 300 implemented on a second terminal device according to some embodiments of the present disclosure. As an example, operations of this flow chart may be performed by a second UE which may act as a peer UE of a first UE which initiates negotiation of the SL DRX configurations.

In one embodiment, the second UE may receive, from the first UE, a signaling indicating a suggestion on one or more SL DRX configurations (block 301). The second UE may then transmit, to the first UE, a first response for each of the SL DRX configurations (block 302).

As an example, the signaling may be at least one of:
PC5-RRC signaling;
MAC CE;
a control PDU of a protocol layer; and
L1 signaling.

As an example, the signaling may comprise details of the one or more SL DRX configurations or indices of the one or more SL DRX configurations.

As an example, the first response may be transmitted via at least one of:
PC5-RRC;
MAC CE;
a control PDU of a protocol layer; and
L1 signaling.

As an example, in the case that the signaling indicates the suggestion on a plurality of SL DRX configurations, the response for one of the SL DRX configurations may be different from the response for another of the SL DRX configurations.

The first response may indicate one of:
partly accepting, by the second UE, the suggestion;
fully accepting, by the second UE, the suggestion; and
fully rejecting, by the second UE, the suggestion.

As a further example, in the case that the first response indicates the full rejection of the suggestion, the method 300 may further comprise one of:
falling back to a default or common DRX configuration;
falling back to a DRX configuration on which the first UE and the second UE have agreed; and
applying no DRX.

As an example, the method 300 may further comprise:
adding a suggestion on non-accepted DRX parameters to first response.

As a further example, the method 300 may further comprise: receiving a second response for negotiation about the non-accepted DRX parameters from the first UE. As a still further example, the second response may indicate one of: fully accepting, by the first UE, the suggestion on the non-accepted DRX parameters; fully rejecting, by the first UE, the suggestion on the non-accepted DRX parameters; and partly accepting, by the first UE, the suggestion on the non-accepted DRX parameters.

As a further example, the second response may be received via at least one of:
PC5-RRC;
MAC CE;
a control PDU of a protocol layer; and
L1 signaling.

As a further example, the negotiation about the non-accepted DRX parameters may comprise a plurality of receptions of responses from the first UE in the case that the first UE and the second UE keep partly accepting suggestions from each other.

As a further example, the negotiation about the non-accepted DRX parameters may terminate when:
a configured time period has been expired;
a configured number of steps have been performed; and/or
the first UE and the second UE have made agreements within a configured time period or a configured number of steps.

As a further example, when the negotiation about the non-accepted DRX parameters terminates, in the case that the first UE and the second UE do not agree on at least one DRX parameter, the method 300 may further comprise one of:
applying configured default or common settings to the at least one DRX parameter; and
applying no DRX.

As an example, in the case that one of the SL DRX configurations has been updated based on a negotiation process with the first UE, the method 300 may further comprise:
transmitting the updated SL DRX configuration to a control node;
receiving adjusted Uu DRX configurations and/or SL DRX configuration from the control node; and
transmitting the adjusted Uu DRX configurations and/or SL DRX configuration to the first UE.

As a further example, the adjusted Uu DRX configurations and/or SL DRX configuration may be transmitted to the first UE via at least one of:
PC5-RRC;
MAC CE;
a control PDU of a protocol layer; and
L1 signaling.

As an example, configurations of the first UE and the second UE may be signaled by a control node or preconfigured.

As a further example, the control node may be a gNB, or a controlling UE, or a combination of the gNB and the controlling UE.

Furthermore, the present disclosure provides a second terminal device adapted to perform the method 300.

Figure 4:
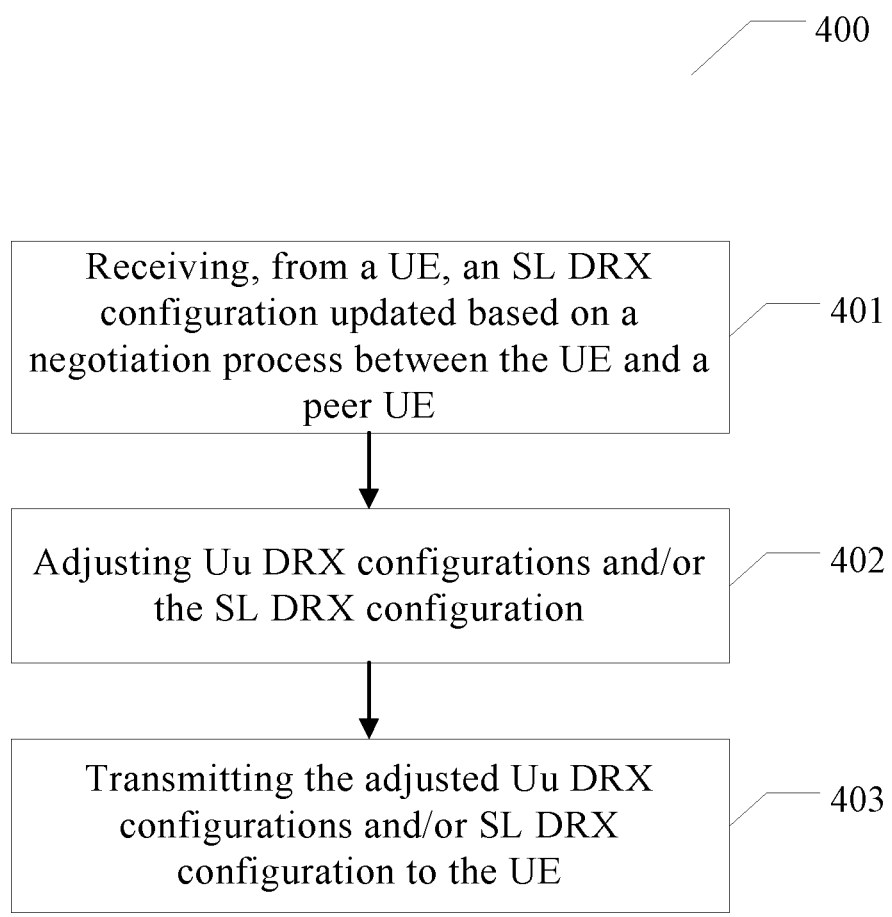
FIG. 4 is a flow chart illustrating a method implemented on a control node according to some embodiments of the present disclosure.

FIG. 4 is a flow chart illustrating a method 400 implemented on a control node according to some embodiments of the present disclosure. As an example, operations of this flow chart may be performed by a gNB or a controlling UE.

In one embodiment, the control node may receive, from a UE, an SL DRX configuration updated based on a negotiation process between the UE and a peer UE (block 401). The control node may adjust Uu DRX configurations and/or the SL DRX configuration (block 402). The control node may then transmit the adjusted Uu DRX configurations and/or SL DRX configuration to the UE (block 403).

As an example, configurations of the UE and the peer UE may be signaled by the control node or preconfigured.

As an example, the control node may a gNB, or a controlling UE, or a combination of the gNB and the controlling UE.

Furthermore, the present disclosure provides a control node adapted to perform the method 400.

Figure 5:
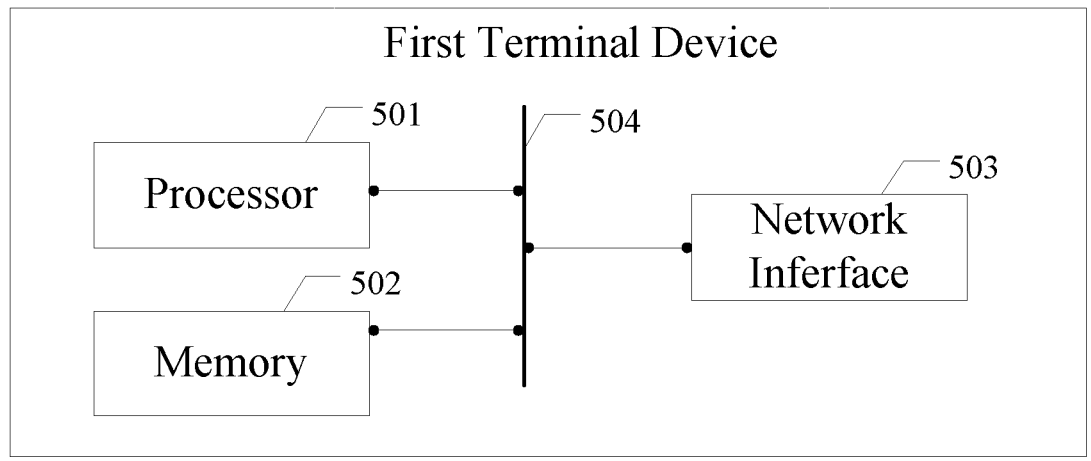
FIG. 5 is a block diagram illustrating a first terminal device according to some embodiments of the present disclosure.

FIG. 5 is a block diagram illustrating a first terminal device 500 according to some embodiments of the present disclosure. As an example, the first terminal device 500 may act as a first UE which may initiate a negotiation process for SL DRX configurations, but it is not limited thereto. It should be appreciated that the first terminal device 500 may be implemented using components other than those illustrated in FIG. 5.

With reference to FIG. 5, the first terminal device 500 may comprise at least a processor 501, a memory 502, a network interface 503 and a communication medium 504. The processor 501, the memory 502 and the network interface 503 may be communicatively coupled to each other via the communication medium 504.

The processor 501 may include one or more processing units. A processing unit may be a physical device or article of manufacture comprising one or more integrated circuits that read data and instructions from computer readable media, such as the memory 502, and selectively execute the instructions. In various embodiments, the processor 501 may be implemented in various ways. As an example, the processor 501 may be implemented as one or more processing cores. As another example, the processor 501 may comprise one or more separate microprocessors. In yet another example, the processor 501 may comprise an application-specific integrated circuit (ASIC) that provides specific functionality. In still another example, the processor 501 may provide specific functionality by using an ASIC and/or by executing computer-executable instructions.

The memory 502 may include one or more computer-usable or computer-readable storage medium capable of storing data and/or computer-executable instructions. It should be appreciated that the storage medium is preferably a non-transitory storage medium.

The network interface 503 may be a device or article of manufacture that enables the first terminal device 500 to send data to or receive data from other devices. In different embodiments, the network interface 503 may be implemented in different ways. As an example, the network interface 503 may be implemented as an Ethernet interface, a token-ring network interface, a fiber optic network interface, a network interface (e.g., Wi-Fi, WiMax, etc.), or another type of network interface.

The communication medium 504 may facilitate communication among the processor 501, the memory 502 and the network interface 503. The communication medium 504 may be implemented in various ways. For example, the communication medium 504 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 5, the instructions stored in the memory 502 may include those that, when executed by the processor 501, cause the first terminal device 500 to implement the method described with respect to FIG. 2.

Figure 6:
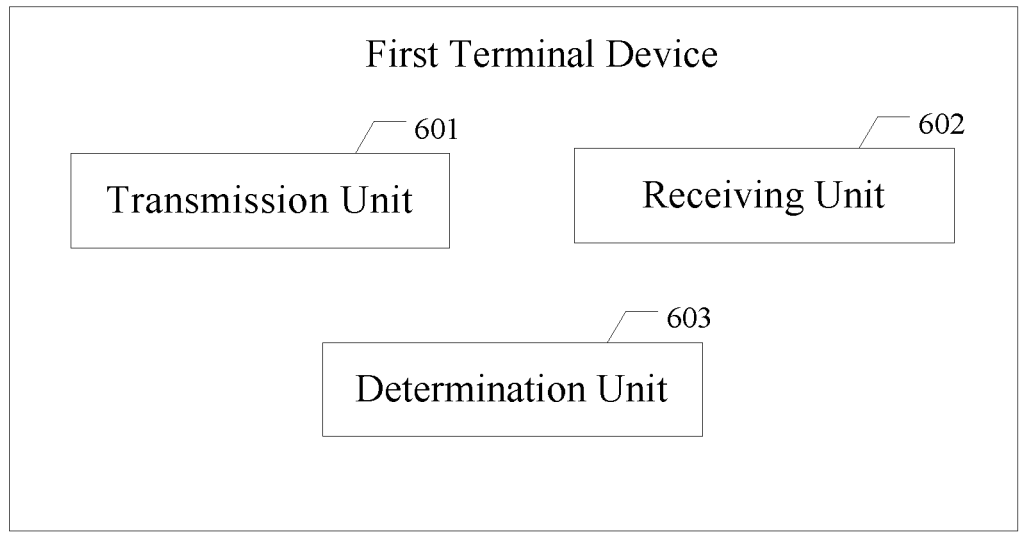
FIG. 6 is another block diagram illustrating a first terminal device according to some embodiments of the present disclosure.

FIG. 6 is another block diagram illustrating a first terminal device 600 according to some embodiments of the present disclosure. As an example, the first terminal device 600 may act as a first UE which may initiate a negotiation process for SL DRX configurations, but it is not limited thereto. It should be appreciated that the first terminal device 600 may be implemented using components other than those illustrated in FIG. 6.

With reference to FIG. 6, the first terminal device 600 may comprise at least a transmission unit 601, a receiving unit 602 and a determination unit 603. The transmission unit 601 may be adapted to perform at least the operation described in the block 201 of FIG. 2. The receiving unit 602 may be adapted to perform at least the operation described in the block 202 of FIG. 2. The determination unit 603 may be adapted to perform at least the operation described in the block 203 of FIG. 2.

Figure 7:
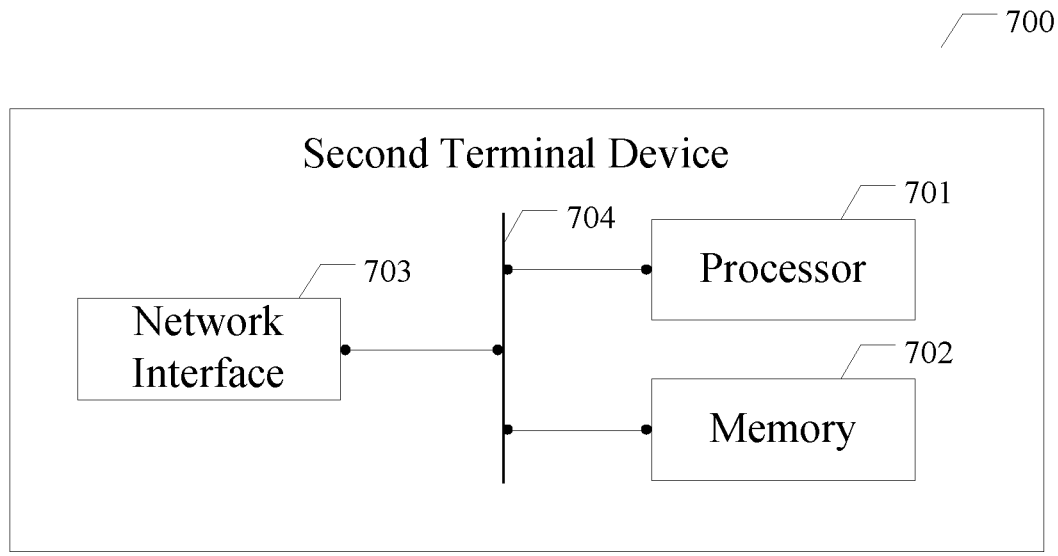
FIG. 7 is a block diagram illustrating a second terminal device according to some embodiments of the present disclosure.

FIG. 7 is a block diagram illustrating a second terminal device 700 according to some embodiments of the present disclosure. As an example, the second terminal device 700 may act as a second UE which is a peer UE of a first UE which initiates negotiation of the SL DRX configurations, but it is not limited thereto. It should be appreciated that the second terminal device 700 may be implemented using components other than those illustrated in FIG. 7.

With reference to FIG. 7, the second terminal device 700 may comprise at least a processor 701, a memory 702, a network interface 703 and a communication medium 704. The processor 701, the memory 702 and the network interface 703 are communicatively coupled to each other via the communication medium 704.

The processor 701, the memory 702, the network interface 703 and the communication medium 704 are structurally similar to the processor 501, the memory 502, the network interface 503 and the communication medium 504 respectively, and will not be described herein in detail.

In the example of FIG. 7, the instructions stored in the memory 702 may include those that, when executed by the processor 701, cause the second terminal device 700 to implement the method described with respect to FIG. 3.

Figure 8:
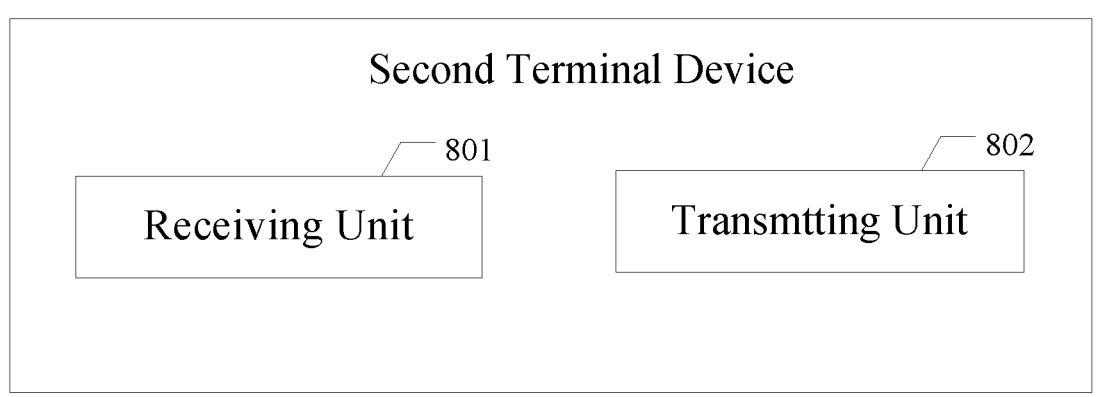
FIG. 8 is another block diagram illustrating a second terminal device according to some embodiments of the present disclosure.

FIG. 8 is another block diagram illustrating a second terminal device 800 according to some embodiments of the present disclosure. As an example, the second terminal device 800 may act as a second UE which is a peer UE of a first UE which initiates negotiation of the SL DRX configurations. It should be appreciated that the second terminal device 800 may be implemented using components other than those illustrated in FIG. 8.

With reference to FIG. 8, the second terminal device 800 may comprise at least a receiving unit 801 and a transmission unit 802. The receiving unit 801 may be adapted to perform at least the operation described in the block 301 of FIG. 3. The transmission unit 802 may be adapted to perform at least the operation described in the block 302 of FIG. 3.

Figure 9:
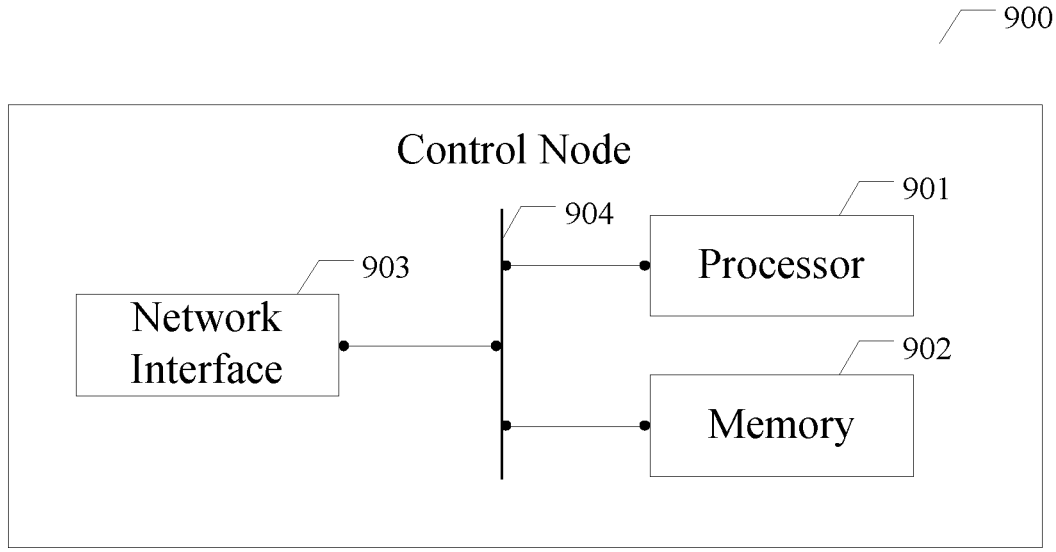
FIG. 9 is a block diagram illustrating a control node according to some embodiments of the present disclosure.

FIG. 9 is a block diagram illustrating a control node 900 according to some embodiments of the present disclosure. As an example, the control node 900 may act as a gNB or a controlling UE, but it is not limited thereto. It should be appreciated that the control node 900 may be implemented using components other than those illustrated in FIG. 9.

With reference to FIG. 9, the control node 900 may comprise at least a processor 901, a memory 902, a network interface 903 and a communication medium 904. The processor 901, the memory 902 and the network interface 903 are communicatively coupled to each other via the communication medium 904.

The processor 901, the memory 902, the network interface 903 and the communication medium 904 are structurally similar to the processor 501 or 701, the memory 502 or 702, the network interface 503 or 703 and the communication medium 504 or 704 respectively, and will not be described herein in detail.

In the example of FIG. 9, the instructions stored in the memory 902 may include those that, when executed by the processor 901, cause the control node 900 to implement the method described with respect to FIG. 4.

Figure 10:
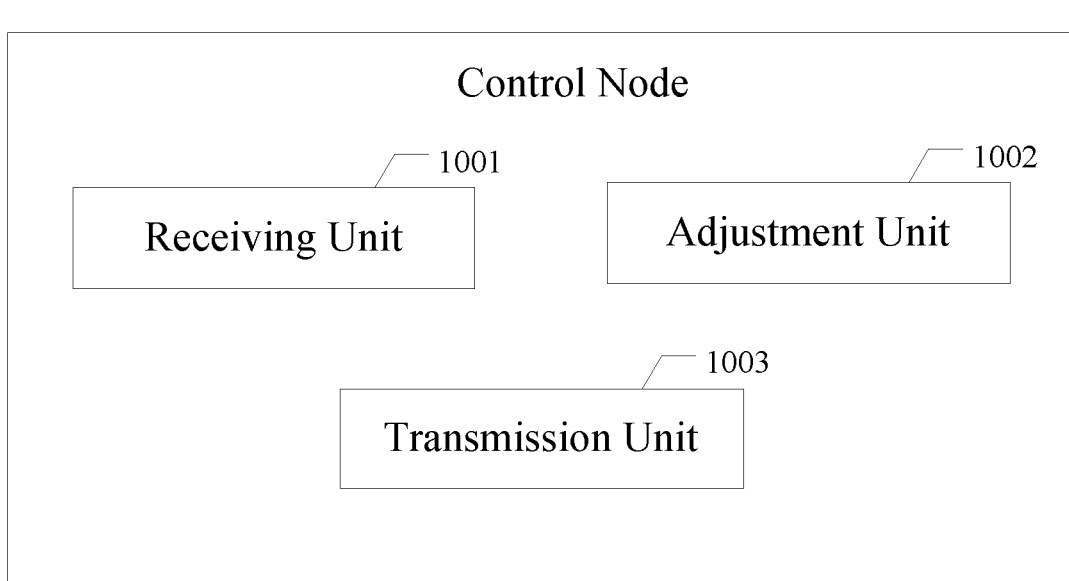
FIG. 10 is another block diagram illustrating a control node according to some embodiments of the present disclosure.

FIG. 10 is another block diagram illustrating a control node 1000 according to some embodiments of the present disclosure. As an example, the control node 1000 may act as a gNB or a controlling UE, but it is not limited thereto. It should be appreciated that the control node 1000 may be implemented using components other than those illustrated in FIG. 10.

With reference to FIG. 10, the control node 1000 may comprise at least a receiving unit 1001, an adjustment unit 1002 and a transmission unit 1003. The receiving unit 1001 may be adapted to perform at least the operation described in the block 401 of FIG. 4. The adjustment unit 1002 may be adapted to perform at least the operation described in the block 402 of FIG. 4. The transmission unit 1003 may be adapted to perform at least the operation described in the block 403 of FIG. 4.

The units shown in FIGS. 6, 8 and 10 may constitute machine-executable instructions embodied within a machine, e.g., readable medium, which when executed by a machine will cause the machine to perform the operations described. Besides, any of these units may be implemented as hardware, such as an application specific integrated circuit (ASIC), Digital Signal Processor (DSP), Field Programmable Gate Array (FPGA) or the like.

Moreover, it should be appreciated that the arrangements described herein are set forth only as examples. Other arrangements (e.g., more controllers or more detectors, etc.) may be used in addition to or instead of those shown, and some units may be omitted altogether. Functionality and cooperation of these units are correspondingly described in more detail with reference to FIGS. 2-4.

Figure 11:
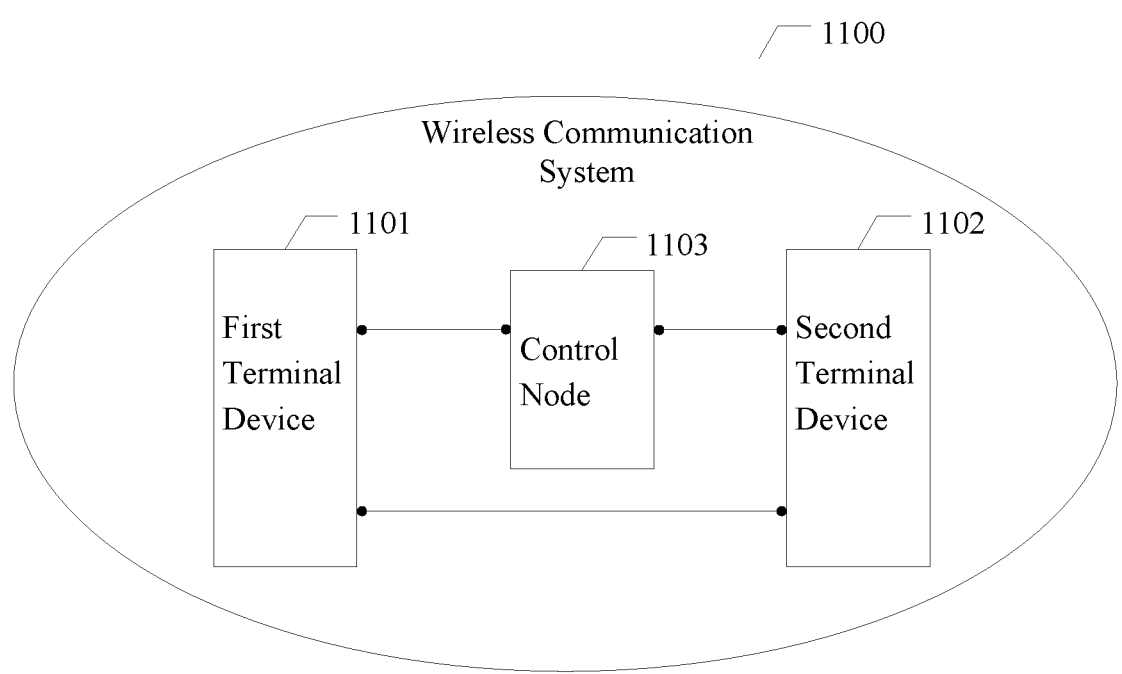
FIG. 11 is a block diagram illustrating a wireless communication system according to some embodiments of the present disclosure.

FIG. 11 is a block diagram illustrating a wireless communication system 1100 according to some embodiments of the present disclosure. The wireless communication system 1100 comprises at least a first terminal device 1101, a second terminal node 1102 and a control node 1103. In one embodiment, the first terminal device 1101 may act as the first terminal device 500 or 600 as depicted in FIG. 5 or 6, the second terminal device 1102 may act as the second terminal device 700 or 800 as depicted in FIG. 7 or 8, and the control node 1103 may act as the control node 900 or 1000 as depicted in FIG. 9 or 10. In one embodiment, the first terminal device 1101, the second terminal device 1102 and the control node 1103 may communicate with each other.

Figure 12:
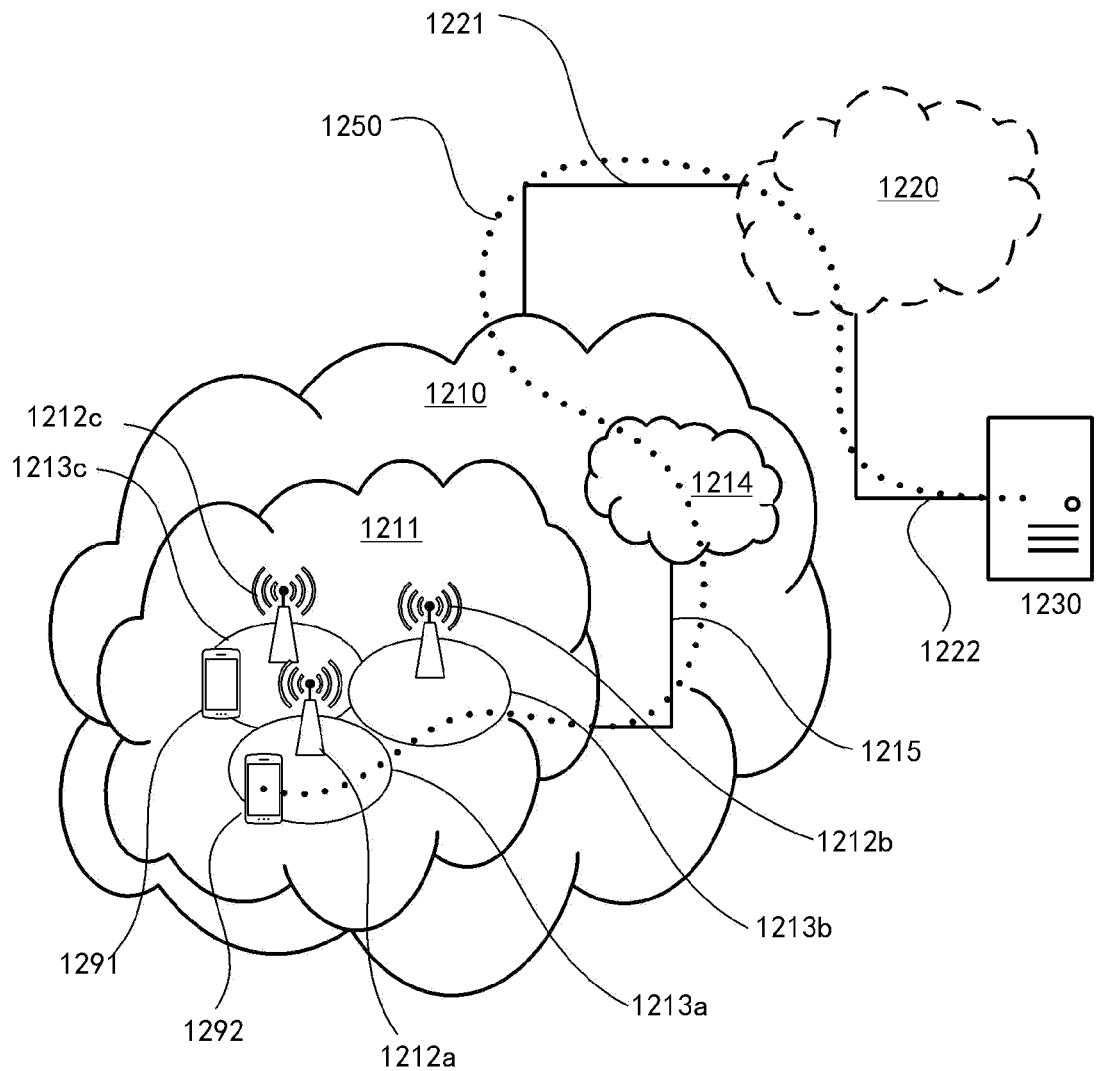
FIG. 12 is a block diagram schematically illustrating a telecommunication network connected via an intermediate network to a host computer.

FIG. 12 is a block diagram schematically illustrating a telecommunication network connected via an intermediate network to a host computer.

With reference to FIG. 12, in accordance with an embodiment, a communication system includes a telecommunication network 1210, such as a 3GPP-type cellular network, which comprises an access network 1211, such as a radio access network, and a core network 1214. The access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to the core network 1214 over a wired or wireless connection 1215. A first user equipment (UE) 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
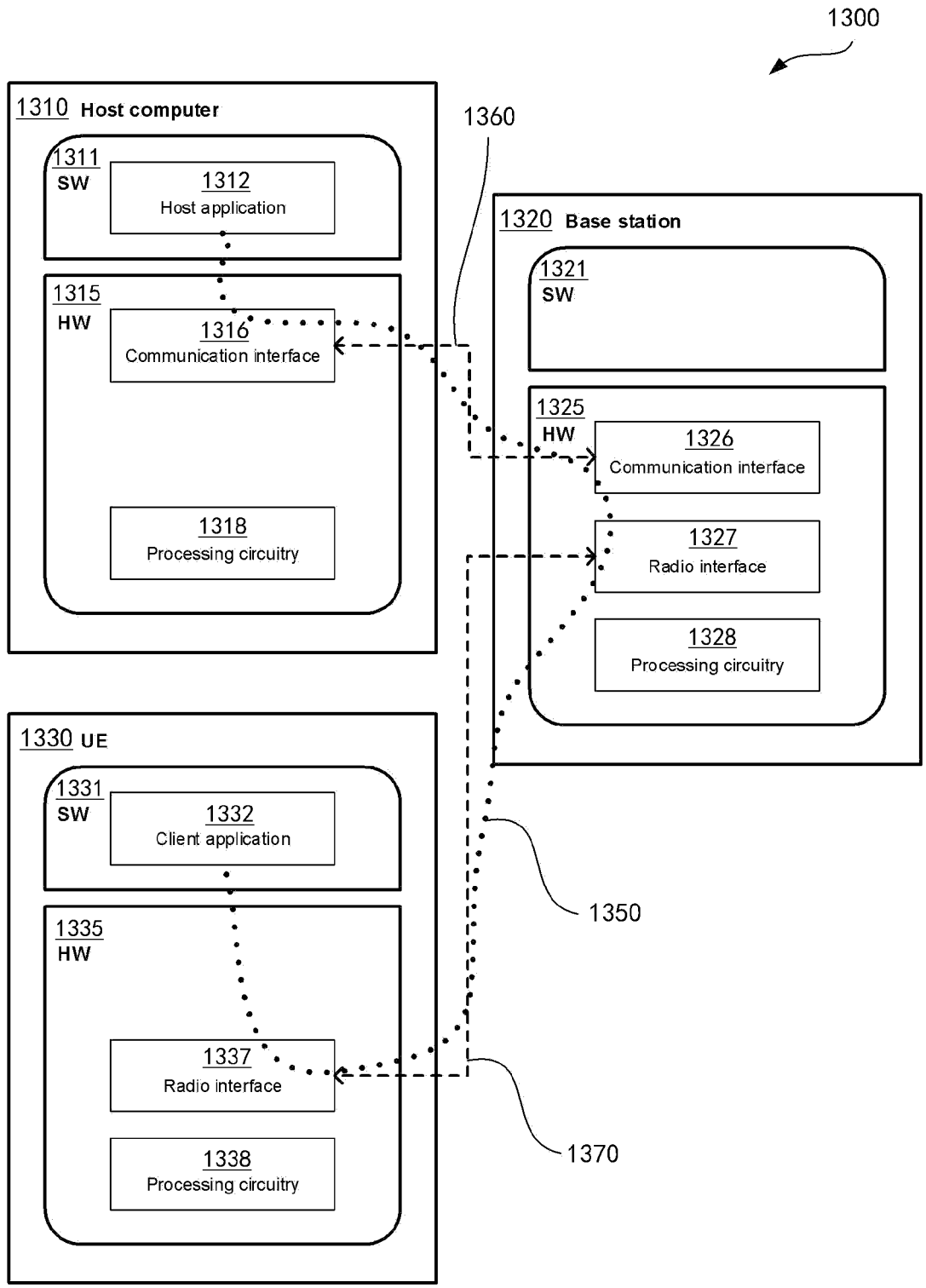
FIG. 13 is a generalized block diagram of a host computer communicating via a base station with a user equipment over a partially wireless connection.

It is noted that the host computer 1310, base station 1320 and UE 1330 illustrated in FIG. 13 may be identical to the host computer 1230, one of the base stations 1212a, 1212b, 1212c and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the user equipment 1330 via the base station 1320, without explicit reference to any intermediary devices and the precise routing of messages via these devices. In the context of SL communication in accordance with the above embodiments, such intermediary device may be further user equipment, and a segment of the OTT connection may be based on the SL communication between the user equipment 1330 and the further user equipment. In this way, the teachings of the embodiments may help to improve the performance of OTT services, e.g., by providing benefits such as reduced user waiting time. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or 'dummy' messages, using the OTT connection 1350 while it monitors propagation times, errors etc.

Figure 14:
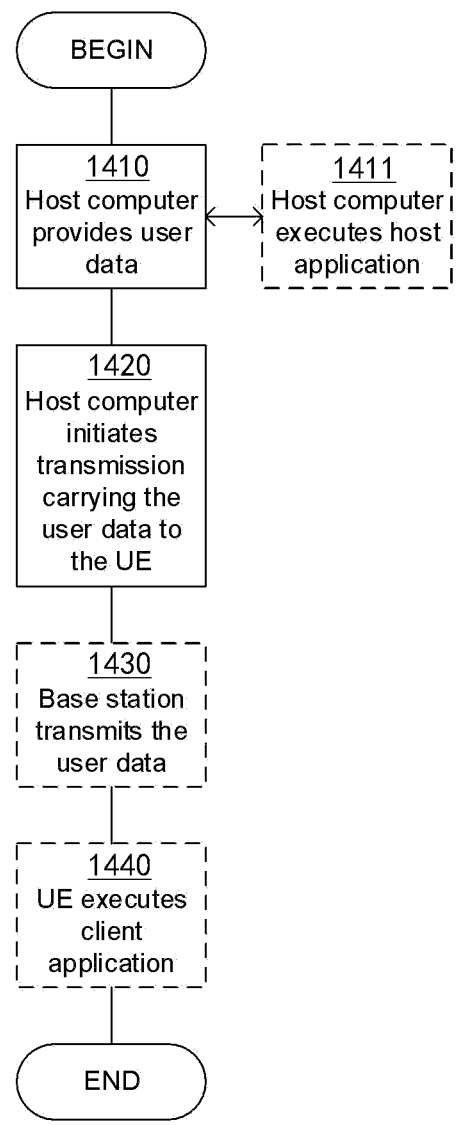
FIGS. 14 to 17 are flowcharts illustrating methods implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

Figure 15:
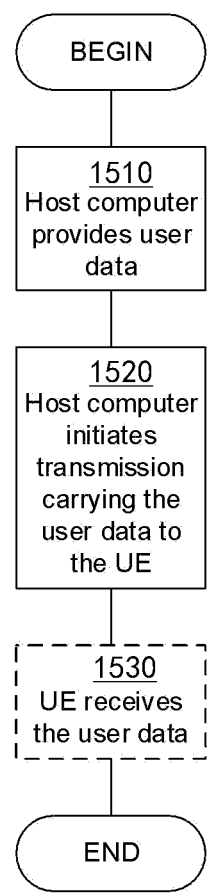

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

Figure 16:
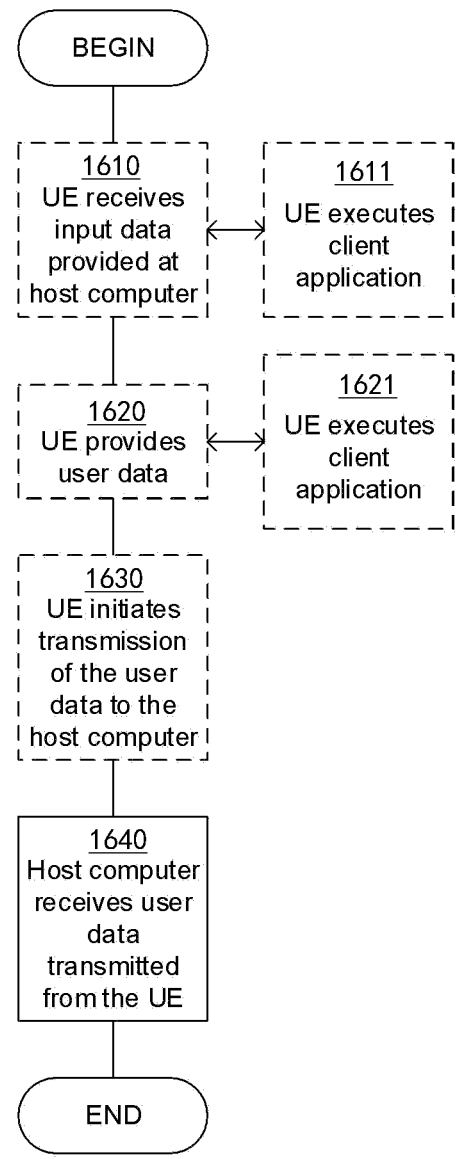

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 1610 of the method, the UE receives input data provided by the host computer. Additionally or alternatively, in an optional second step 1620, the UE provides user data. In an optional substep 1621 of the second step 1620, the UE provides the user data by executing a client application. In a further optional substep 1611 of the first step 1610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1630, transmission of the user data to the host computer. In a fourth step 1640 of the method, the host computer receives the user data transmitted from the UE, in accordance with the teachings of the embodiments described throughout this disclosure.

Figure 17:
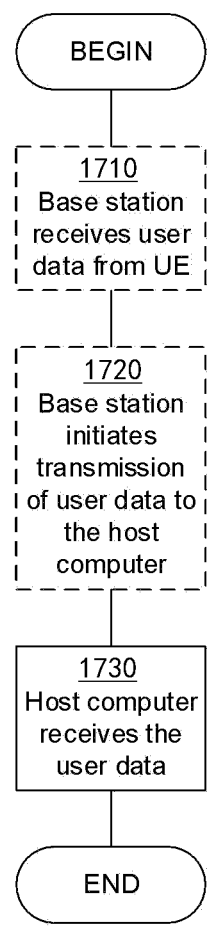

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 1710 of the method, in accordance with the teachings of the embodiments described throughout this disclosure, the base station receives user data from the UE. In an optional second step 1720, the base station initiates transmission of the received user data to the host computer. In a third step 1730, the host computer receives the user data carried in the transmission initiated by the base station.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the present disclosure.

In view of the above, examples provided by present disclosure include:

Example 1

A method (200) implemented by a first terminal device, the method comprising:
 transmitting (201) a signaling indicating a suggestion on one or more sidelink discontinuous reception, SL DRX, configurations to a second terminal device;
 receiving (202) a first response for each of the SL DRX configurations from the second terminal device; and
 determining (203) whether to continue negotiation about the SL DRX configurations with the second terminal device based on the received first response.

Example 2

The method of example 1, wherein the signaling is at least one of:
 PC5-radio resource control, RRC, signaling;
 media access control, MAC, control element, CE;
 a control protocol data unit, PDU, of a protocol layer; and
 layer 1, L1, signaling.

Example 3

The method of example 1 or 2, wherein the transmission of the signaling is initiated upon at least one of the following events:
 a PC5 link or PC5-RRC connection is established between the first terminal device and the second terminal device;
 a PC5 session belonging to the PC5 link or PC5-RRC connection is established or reconfigured;
 a PC5 data radio bearer, DRB, or signaling radio bearer, SRB, belonging to the PC5 link or PC5-RRC connection is established or reconfigured; and
 one or more Uu DRX configurations of the first terminal device are generated or reconfigured.

Example 4

The method of any of examples 1-3, wherein the signaling comprises details of the one or more SL DRX configurations or indices of the one or more SL DRX configurations.

Example 5

The method of any of examples 1-4, wherein the first response is received via at least one of:
 PC5-RRC;
 MAC CE;
 a control PDU of a protocol layer; and
 L1 signaling.

Example 6

The method of any of examples 1-5, wherein in the case that the signaling indicates the suggestion on a plurality of SL DRX configurations, the response for one of the SL DRX configurations is different from the response for another of the SL DRX configurations.

Example 7

The method of any of examples 1-6, wherein the first response indicates one of:
fully accepting, by the second terminal device, the suggestion;
fully rejecting, by the second terminal device, the suggestion; and
partly accepting, by the second terminal device, the suggestion and making a suggestion on non-accepted DRX parameters.

Example 8

The method of example 7, wherein in the case that the first response indicates the full rejection of the suggestion, the method further comprises one of:
falling back to a default or common DRX configuration;
falling back to a DRX configuration on which the first terminal device and the second terminal device have agreed; and
applying no DRX.

Example 9

The method of example 7, wherein in the case that the first response indicates the partial acceptance of the suggestion, the method further comprises:
negotiating about the non-accepted DRX parameters with the second terminal device.

Example 10

The method of example 9, wherein the negotiation about the non-accepted DRX parameters with the second terminal device further comprises:
transmitting a second response for the non-accepted DRX parameters to the second terminal device,
wherein the second response indicates one of:
fully accepting, by the first terminal device, the suggestion on the non-accepted DRX parameters;
fully rejecting, by the first terminal device, the suggestion on the non-accepted DRX parameters; and
partly accepting, by the first terminal device, the suggestion on the non-accepted DRX parameters.

Example 11

The method of example 10, wherein the second response is transmitted via at least one of:
PC5-RRC;
MAC CE;
a control PDU of a protocol layer; and
L1 signaling.

Example 12

The method of any of examples 9-11, wherein the negotiation about the non-accepted DRX parameters with the second terminal device comprises a plurality of transmissions of responses to the second terminal device in the case that the first terminal device and the second terminal device keep partly accepting suggestions from each other.

Example 13

The method of any of examples 9-12, wherein the negotiation about the non-accepted DRX parameters with the second terminal device terminates when:
a configured time period has been expired;
a configured number of steps have been performed; and/or
the first terminal device and the second terminal device have made agreements within a configured time period or a configured number of steps.

Example 14

The method of example 13, wherein when the negotiation about the non-accepted DRX parameters terminates, in the case that the first terminal device and the second terminal device do not agree on at least one DRX parameter, the method further comprises one of:
applying configured default or common settings to the at least one DRX parameter; and
applying no DRX.

Example 15

The method of any of examples 1-14, wherein in the case that one of the SL DRX configurations has been updated based on a negotiation process with the second terminal device, the method further comprises:
transmitting the updated SL DRX configuration to a control node;
receiving adjusted Uu DRX configurations and/or SL DRX configuration from the control node; and
transmitting the adjusted Uu DRX configurations and/or SL DRX configuration to the second terminal device.

Example 16

The method of example 15, wherein the adjusted Uu DRX configurations and/or SL DRX configuration are transmitted to the second terminal device via at least one of:
PC5-RRC;
MAC CE;
a control PDU of a protocol layer; and
L1 signaling.

Example 17

The method of any of example 1-16, wherein configurations of the first terminal device and the second terminal device are signaled by a control node or preconfigured.

Example 18

The method of any of examples 15-17, wherein the control node is a gNB, or a controlling terminal device, or a combination of the gNB and the controlling terminal device.

Example 19

A method (300) implemented by a second terminal device, the method comprising:

receiving (301), from a first terminal device, a signaling indicating a suggestion on one or more sidelink discontinuous reception, SL DRX, configurations; and transmitting (302), to the first terminal device, a first response for each of the SL DRX configurations indicating that the second terminal device partly accepts the suggestion.

Example 20

The method of example 19, wherein the signaling is at least one of:
PC5-radio resource control, RRC, signaling;
media access control, MAC, control element, CE;
a control protocol data unit, PDU, of a protocol layer; and
layer 1, L1, signaling.

Example 21

The method of example 19 or 20, wherein the signaling comprises details of the one or more SL DRX configurations or indices of the one or more SL DRX configurations.

Example 22

The method of any of examples 19-21, wherein the first response is transmitted via at least one of:
PC5-RRC;
MAC CE;
a control PDU of a protocol layer; and
L1 signaling.

Example 23

The method of any of examples 19-22, wherein in the case that the signaling indicates the suggestion on a plurality of SL DRX configurations, the response for one of the SL DRX configurations is different from the response for another of the SL DRX configurations.

Example 24

The method of any of examples 19-23, wherein the first response indicates one of:
fully accepting, by the second terminal device, the suggestion; and
fully rejecting, by the second terminal device, the suggestion.

Example 25

The method of example 24, wherein in the case that the first response indicates the full rejection of the suggestion, the method further comprises one of:
falling back to a default or common DRX configuration;
falling back to a DRX configuration on which the first terminal device and the second terminal device have agreed; and
applying no DRX.

Example 26

The method of any of examples 19-23, wherein the method further comprises: adding a suggestion on non-accepted DRX parameters to first response.

Example 27

The method of example 26, further comprising:
receiving a second response for negotiation about the non-accepted DRX parameters from the first terminal device,
wherein the second response indicates one of:
fully accepting, by the first terminal device, the suggestion on the non-accepted DRX parameters;
fully rejecting, by the first terminal device, the suggestion on the non-accepted DRX parameters; and
partly accepting, by the first terminal device, the suggestion on the non-accepted DRX parameters.

Example 28

The method of example 27, wherein the second response is received via at least one of:
PC5-RRC;
MAC CE;
a control PDU of a protocol layer; and
L1 signaling.

Example 29

The method of example 27 or 28, wherein the negotiation about the non-accepted DRX parameters comprises a plurality of receptions of responses from the first terminal device in the case that the first terminal device and the second terminal device keep partly accepting suggestions from each other.

Example 30

The method of any of examples 27-29, wherein the negotiation about the non-accepted DRX parameters terminates when:
a configured time period has been expired;
a configured number of steps have been performed; and/or
the first terminal device and the second terminal device have made agreements within a configured time period or a configured number of steps.

Example 31

The method of example 30, wherein when the negotiation about the non-accepted DRX parameters terminates, in the case that the first terminal device and the second terminal device do not agree on at least one DRX parameter, the method further comprises one of:
applying configured default or common settings to the at least one DRX parameter; and
applying no DRX.

Example 32

The method of any of examples 19-31, wherein in the case that one of the SL DRX configurations has been updated based on a negotiation process with the first terminal device, the method further comprises:
transmitting the updated SL DRX configuration to a control node;
receiving adjusted Uu DRX configurations and/or SL DRX configuration from the control node; and
transmitting the adjusted Uu DRX configurations and/or SL DRX configuration to the first terminal device.

Example 33

The method of example 32, wherein the adjusted Uu DRX configurations and/or SL DRX configuration are transmitted to the first terminal device via at least one of:
PC5-RRC;
MAC CE;
a control PDU of a protocol layer; and
L1 signaling.

Example 34

The method of any of examples 19-33, wherein configurations of the first terminal device and the second terminal device are signaled by a control node or preconfigured.

Example 35

The method of any of examples 32-34, wherein the control node is a gNB, or a controlling terminal device, or a combination of the gNB and the controlling terminal device.

Example 36

A method (400) implemented by a control node, the method comprising:
  receiving (401), from a terminal device, a sidelink discontinuous reception, SL DRX, configuration updated based on a negotiation process between the terminal device and a peer terminal device;
  adjusting (402) Uu DRX configurations and/or the SL DRX configuration; and transmitting (403) the adjusted Uu DRX configurations and/or SL DRX configuration to the terminal device.

Example 37

The method of example 36, wherein configurations of the terminal device and the peer terminal device are signaled by the control node or preconfigured.

Example 38

The method of example 36 or 37, wherein the control node is a gNB, or a controlling terminal device, or a combination of the gNB and the controlling terminal device.

Example 39

A first terminal device (500), comprising:
a processor; and
a memory communicatively coupled to the processor and adapted to store instructions which, when executed by the processor, cause the first terminal device to perform operations of the method of any of examples 1-18.

Example 40

A first terminal device adapted to perform the method of any of examples 1-18.

Example 41

A second terminal device (700), comprising:
a processor; and
a memory communicatively coupled to the processor and adapted to store instructions which, when executed by the processor, cause the second terminal device to perform operations of the method of any of examples 19-35.

Example 42

A second terminal device adapted to perform the method of any of examples 19-35.

Example 43

A control node (900), comprising:
a processor; and
a memory communicatively coupled to the processor and adapted to store instructions which, when executed by the processor, cause the control node to perform operations of the method of any of examples 36-38.

Example 44

A control node adapted to perform the method of any of examples 36-38.

Example 45

A wireless communication system (1100), comprising:
a first terminal device (1101) of example 39 or 40;
a second terminal device (1102) of example 41 or 42, communicating with at least the first terminal device; and
a control node (1103) of example 43 or 44, communicating with at least the first terminal device and the second terminal device.

Example 46

A non-transitory computer readable medium having a computer program stored thereon which, when executed by a set of one or more processors of a first terminal device, causes the first terminal device to perform operations of the method of any of examples 1-18.

Example 47

A non-transitory computer readable medium having a computer program stored thereon which, when executed by a set of one or more processors of a second terminal device, causes the second terminal device to perform operations of the method of any of examples 19-35.

Example 48

A non-transitory computer readable medium having a computer program stored thereon which, when executed by a set of one or more processors of a control node, causes the control node to perform operations of the method of any of examples 36-38.

The invention claimed is:
1. A method implemented by a first terminal device, the method comprising:
  transmitting a signaling indicating a suggestion on one or more sidelink discontinuous reception (SL DRX) configurations to a second terminal device; and receiving a first response for each of the one or more SL DRX configurations from the second terminal device, wherein the first response indicates one of:
  fully accepting, by the second terminal device, the suggestion;
  fully rejecting, by the second terminal device, the suggestion; and
  partly accepting, by the second terminal device, the suggestion;
wherein in the case that the first response indicates the partial acceptance of the suggestion, the method further comprises negotiating about the non-accepted DRX parameters with the second terminal device; and
wherein the negotiation about the non-accepted DRX parameters with the second terminal device terminates when:
  a configured time period has been expired;
  a configured number of steps have been performed; and/or
  the first terminal device and the second terminal device have made agreements within a configured time period or a configured number of steps.

2. The method of claim 1, wherein the transmission of the signaling is initiated upon at least one of the following events:
  a PC5 link or PC5-RRC connection is established between the first terminal device and the second terminal device;
  a PC5 session belonging to the PC5 link or PC5-RRC connection is established or reconfigured;
  a PC5 data radio bearer, DRB, or signaling radio bearer, SRB, belonging to the PC5 link or PC5-RRC connection is established or reconfigured; and
  one or more Uu DRX configurations of the first terminal device are generated or reconfigured.

3. The method of claim 1, wherein in the case that the first response indicates the full rejection of the suggestion, the method further comprises one of:
  falling back to a default or common DRX configuration;
  falling back to a DRX configuration on which the first terminal device and the second terminal device have agreed; and
  applying no DRX.

4. The method of claim 1, wherein when the negotiation about the non-accepted DRX parameters terminates, in the case that the first terminal device and the second terminal device do not agree on at least one DRX parameter, the method further comprises one of:
  applying configured default or common settings to the at least one DRX parameter; and
  applying no DRX.

5. The method of claim 1, wherein in the case that one of the SL DRX configurations has been updated based on a negotiation process with the second terminal device, the method further comprises:
  transmitting the updated SL DRX configuration to a control node;
  receiving adjusted Uu DRX configurations and/or SL DRX configuration from the control node; and
  transmitting the adjusted Uu DRX configurations and/or SL DRX configuration to the second terminal device.

6. A method implemented by a second terminal device, the method comprising:
  receiving, from a first terminal device, a signaling indicating a suggestion on one or more sidelink discontinuous reception (SL DRX) configurations; and
  transmitting, to the first terminal device, a first response for each of the one or more SL DRX configurations, wherein the first response indicates one of:
    fully accepting, by the second terminal device, the suggestion;
    fully rejecting, by the second terminal device, the suggestion; and
    partly accepting, by the second terminal device, the suggestion;
  wherein in the case that the first response indicates the partial acceptance of the suggestion, the method further comprises adding a suggestion on non-accepted DRX parameters to first response; and
  wherein a negotiation about the non-accepted DRX parameters terminates when:
    a configured time period has been expired;
    a configured number of steps have been performed; and/or
    the first terminal device and the second terminal device have made agreements within a configured time period or a configured number of steps.

7. The method of claim 6, wherein in the case that the first response indicates the full rejection of the suggestion, the method further comprises one of:
  falling back to a default or common DRX configuration;
  falling back to a DRX configuration on which the first terminal device and the second terminal device have agreed; and
  applying no DRX.

8. The method of claim 6, wherein when the negotiation about the non-accepted DRX parameters terminates, in the case that the first terminal device and the second terminal device do not agree on at least one DRX parameter, the method further comprises one of:
  applying configured default or common settings to the at least one DRX parameter; and
  applying no DRX.

9. The method of claim 6, wherein in the case that one of the SL DRX configurations has been updated based on a negotiation process with the first terminal device, the method further comprises:
  transmitting the updated SL DRX configuration to a control node;
  receiving adjusted Uu DRX configurations and/or SL DRX configuration from the control node; and
  transmitting the adjusted Uu DRX configurations and/or SL DRX configuration to the first terminal device.

10. A first terminal device, comprising:
  a processor; and
  a memory communicatively coupled to the processor and adapted to store instructions which, when executed by the processor, cause the first terminal device to:
    transmit a signaling indicating a suggestion on one or more sidelink discontinuous reception (SL DRX) configurations to a second terminal device; and
    receive a first response for each of the one or more SL DRX configurations from the second terminal device, wherein the first response indicates one of:
      fully accepting, by the second terminal device, the suggestion;
      fully rejecting, by the second terminal device, the suggestion; and
      partly accepting, by the second terminal device, the suggestion;
    wherein in the case that the first response indicates the partial acceptance of the suggestion, the first terminal device is further caused to negotiate about the non-accepted DRX parameters with the second terminal device; and wherein the negotiation about the non-accepted DRX parameters with the second terminal device terminates when:
   a configured time period has been expired;
   a configured number of steps have been performed; and/or
     the first terminal device and the second terminal device have made agreements within a configured time period or a configured number of steps.

11. A second terminal device, comprising:
a processor; and
a memory communicatively coupled to the processor and adapted to store instructions which, when executed by the processor, cause the second terminal device to:
   receive, from a first terminal device, a signaling indicating a suggestion on one or more sidelink discontinuous reception (SL DRX) configurations; and
   transmit, to the first terminal device, a first response for each of the one or more SL DRX configurations, wherein the first response indicates one of: fully accepting, by the second terminal device, the suggestion; fully rejecting, by the second terminal device, the suggestion; and partly accepting, by the second terminal device, the suggestion;

wherein in the case that the first response indicates the partial acceptance of the suggestion, the second terminal device is further caused to add a suggestion on non-accepted DRX parameters to first response; and wherein a negotiation about the non-accepted DRX parameters terminates when:
   a configured time period has been expired;
   a configured number of steps have been performed; and/or
   the first terminal device and the second terminal device have made agreements within a configured time period or a configured number of steps.

\* \* \* \* \*